(12) United States Patent
Park

(10) Patent No.: US 12,009,537 B2
(45) Date of Patent: Jun. 11, 2024

(54) BATTERY PACK

(71) Applicant: SAMSUNG SDI CO., LTD., Yongin-si (KR)

(72) Inventor: Sang Hun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 398 days.

(21) Appl. No.: 17/069,951

(22) Filed: Oct. 14, 2020

(65) Prior Publication Data

US 2021/0175481 A1 Jun. 10, 2021

(30) Foreign Application Priority Data

Dec. 4, 2019 (KR) .................. 10-2019-0159720

(51) Int. Cl.
*H01M 50/209* (2021.01)
(52) U.S. Cl.
CPC ................................ *H01M 50/209* (2021.01)
(58) Field of Classification Search
CPC . H01M 50/209; H01M 50/202; H01M 50/262
See application file for complete search history.

(56) References Cited

U.S. PATENT DOCUMENTS

| | | | |
|---|---|---|---|
| 8,691,420 B2 | 4/2014 | Yoo | |
| 9,515,302 B2 * | 12/2016 | Ahn | .................... H01M 50/293 |
| 2010/0075216 A1 | 3/2010 | Yoo | |
| 2012/0231302 A1 | 9/2012 | Ahn | |
| 2013/0171477 A1 * | 7/2013 | Park | .................... H01M 50/213 |
| | | | 429/7 |
| 2014/0220412 A1 * | 8/2014 | Lee | .................... H01M 50/20 |
| | | | 429/151 |
| 2015/0337619 A1 | 2/2015 | Ahn | |

FOREIGN PATENT DOCUMENTS

| | | | |
|---|---|---|---|
| CN | 101677133 | A | 3/2010 |
| CN | 103972442 | A | 8/2014 |
| CN | 104183799 | A | 12/2014 |
| CN | 104347832 | A | 2/2015 |
| CN | 104377339 | A | 2/2015 |
| CN | 206947400 | U | 1/2018 |
| CN | 208767371 | U | 4/2019 |
| EP | 0508248 | A1 | 10/1992 |
| JP | 2003109558 | A | 4/2003 |
| JP | 2004319314 | A | 11/2004 |
| JP | 2008-112660 | A | 5/2008 |
| JP | 4573501 | B2 | 8/2010 |
| KR | 10-0988655 | B1 | 10/2010 |

OTHER PUBLICATIONS

Chinese Office action dated Oct. 8, 2022.
Chinese Office Action dated Jun. 30, 2023, of the Chinese Patent Application No. 202011412313.X.

\* cited by examiner

*Primary Examiner* — Maria Laios
*Assistant Examiner* — Jordan E Berresford
(74) *Attorney, Agent, or Firm* — Lee IP Law, P.C.

(57) ABSTRACT

A battery pack includes a main frame supporting a battery cell, the main frame including a hook hole and a reinforcer adjacent to the hook hole; and a main cover coupled to the main frame, the main cover including a hook inserted into and retained in engagement with the hook hole, wherein the reinforcer faces the hook hole with the hook therebetween to support the hook.

11 Claims, 5 Drawing Sheets

510: 511, 513, 515, 517, 519

BATTERY PACK

CROSS-REFERENCE TO RELATED APPLICATION

Korean Patent Application No. 10-2019-0159720, filed on Dec. 4, 2019, in the Korean Intellectual Property Office, and entitled: "Battery Pack," is incorporated by reference herein in its entirety.

BACKGROUND

1. Field

Embodiments relate to a battery pack.

2. Description of the Related Art

An electronic device, such as a notebook computer, a mini notebook computer, a net-book, a mobile computer, an ultra-mobile personal computer (UMPC) or a portable multimedia player (PMP), may employ a battery pack in which a plurality of batteries connected in series and/or parallel are used as a portable power supply. The battery pack may include a protective circuit module (PCM) for protecting the battery cells from over-charge, over-discharge and/or over-current. The battery cells and the protective circuit module may be embedded in the battery pack with a case.

The above information disclosed in this Background section is only for enhancement of understanding of the background of the described technology and therefore it may contain information that does not form the prior art that is already known in this country to a person of ordinary skill in the art.

SUMMARY

The embodiments may be realized by providing a battery pack including a main frame supporting a battery cell, the main frame including a hook hole and a reinforcer adjacent to the hook hole; and a main cover coupled to the main frame, the main cover including a hook inserted into and retained in engagement with the hook hole, wherein the reinforcer faces the hook hole with the hook therebetween to support the hook.

The main frame may include a mounting surface configured to support a surface of the battery cell, and a sidewall portion extending along edges of the mounting surface, and the reinforcer may include a first rib parallel with the sidewall portion, extending from the mounting surface, and being between the battery cell and the sidewall portion, and a connection rib integrally formed with opposite ends of the first rib to connect the opposite ends of the first rib to the sidewall portion.

The main frame may further include a sub-frame adjacent to the first rib and parallel with the sidewall portion, the sub-frame extending from the mounting surface, being between the battery cell and the first rib, and being in contact with another surface of the battery cell.

The reinforcer further may further include a reinforcement rib integrally formed with the connection rib and extending toward the sub-frame to be connected to the sub-frame.

A contact point, at which a top of the reinforcement rib is connected to a top of the sub-frame, may be positioned farther from the mounting surface than a mid-point of the hook hole is from the mounting surface.

A height of the reinforcement rib from the mounting surface may be larger than a height of a mid-point of the hook hole from the mounting surface.

A length of the first rib may be smaller than a length of the sub-frame.

The reinforcement rib may be adjacent to the hook hole.

A contact region of the reinforcement rib and the sub-frame may be distal to the hook hole such that the contact region is spaced apart from a region where a contact end of the hook locked into the hook hole contacts the hook hole.

A contact point, at which a top of the reinforcement rib is connected to a top of the sub-frame, may be positioned farther from the mounting surface than the contact end is from the mounting surface.

The embodiments may be realized by providing a battery pack including a main frame on which a battery cell is supportable, the main frame including a hook hole and a reinforcer adjacent to the hook hole; and a main cover coupled to the main frame, the main cover including a hook inserted into and retained in engagement with the hook hole, wherein the reinforcer faces the hook hole with the hook therebetween to support the hook.

BRIEF DESCRIPTION OF DRAWINGS

Features will be apparent to those of skill in the art by describing in detail exemplary embodiments with reference to the attached drawings in which.

DETAILED DESCRIPTION

Figure 1:
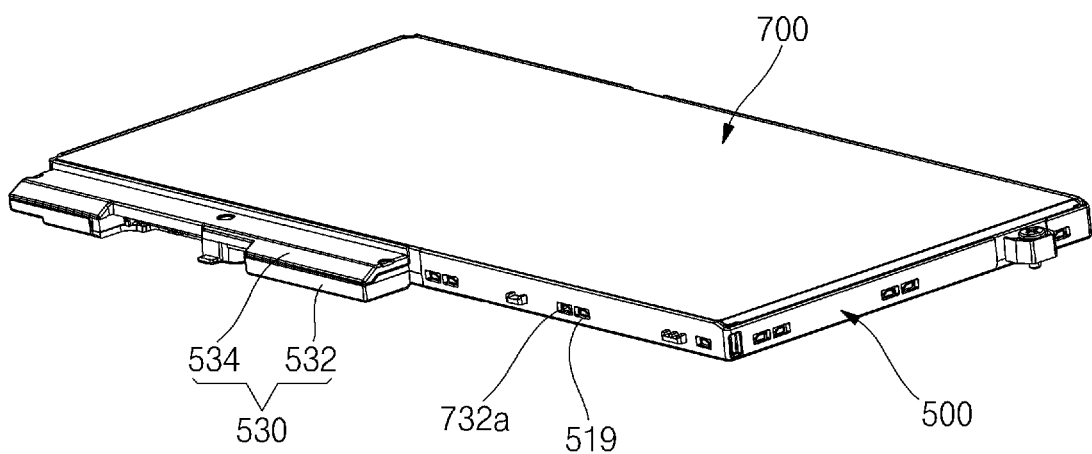
FIG. 1 is a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "include," "including," "comprise," and "comprising" when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

For ease of description of major components of the present disclosure, the upper side and the lower side are defined as an upward direction and a downward direction, respectively, on the basis of FIG. 1. In addition, on the basis of FIG. 1, the longer- and shorter-side directions of a main frame are defined as a lengthwise direction and a widthwise direction, respectively, the direction facing an exterior side of the battery pack is defined as an outward direction, and the direction opposite to the outward direction is defined as an inward direction. Therefore, if directions of the respective components arranged are changed, coupling relations between each of various components are intended to embrace all the concepts varying according to such changes.

Figure 2:
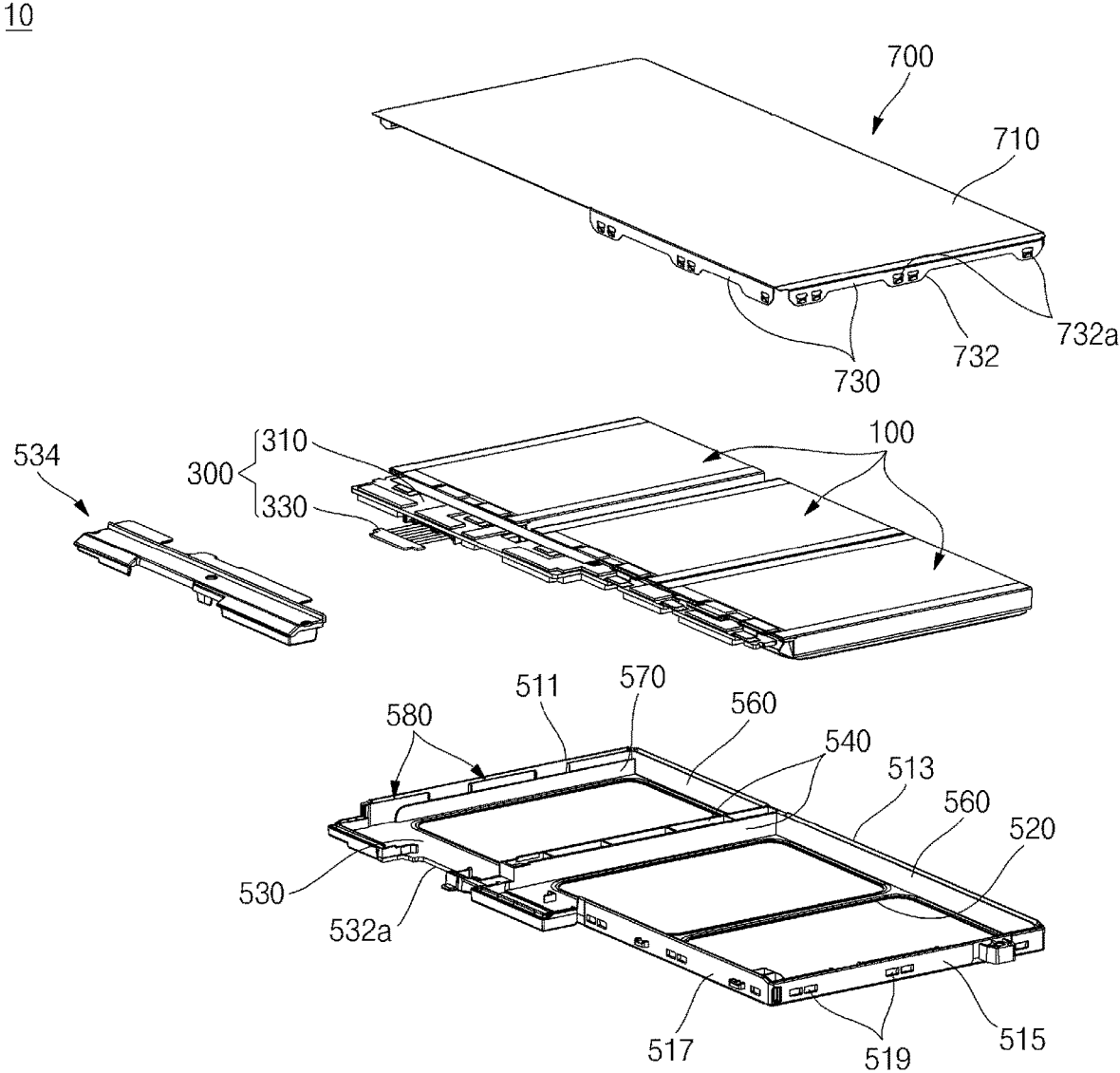
FIG. 2 is an exploded perspective view of the battery pack shown in FIG. 1.
Figure 3:
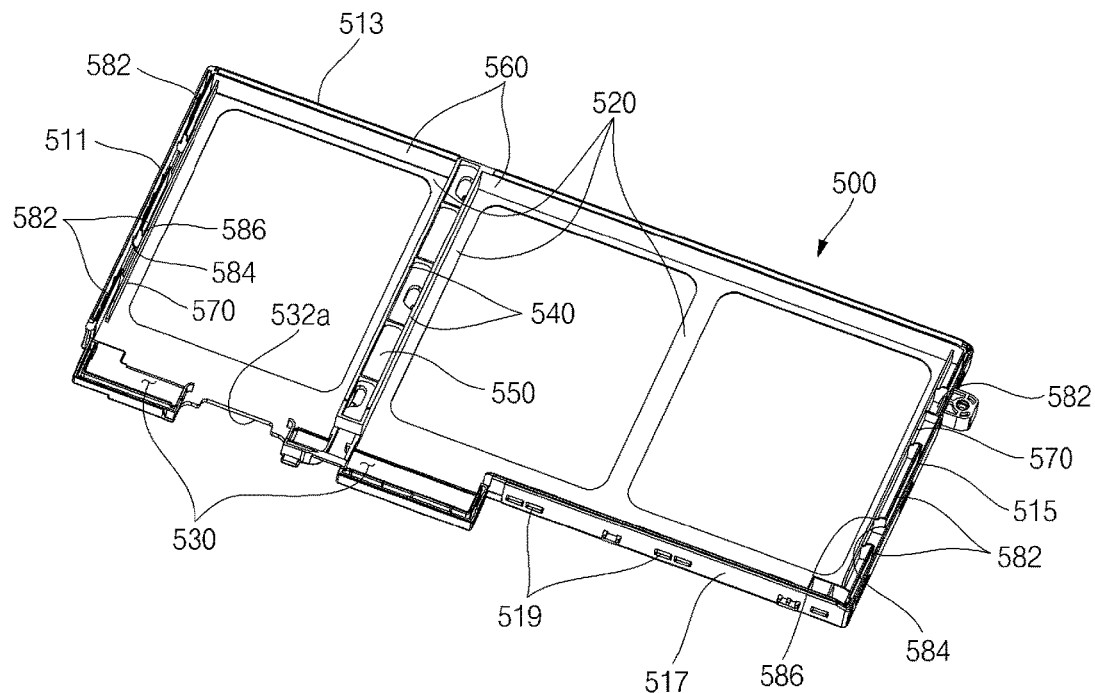
FIG. 3 is a perspective view of a main frame of the battery pack shown in FIGS. 1 and 2.
Figure 4:
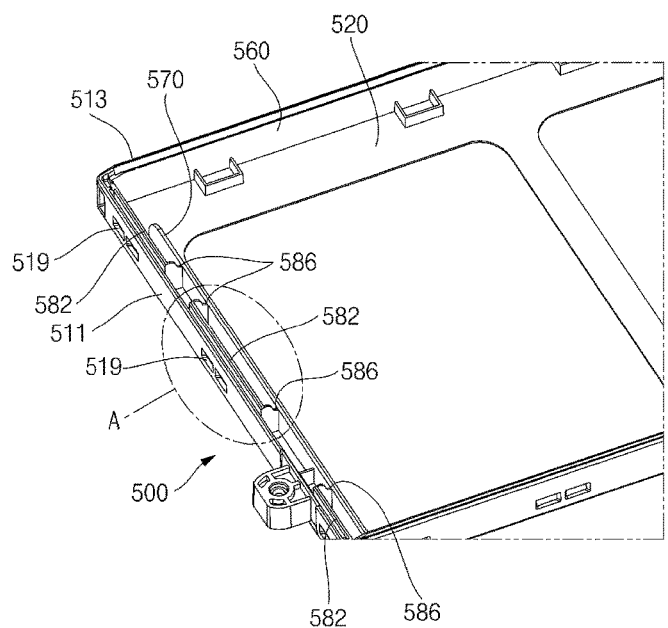
FIG. 4 is an enlarged perspective view of major parts of the main frame shown in FIG. 3.
Figure 5:
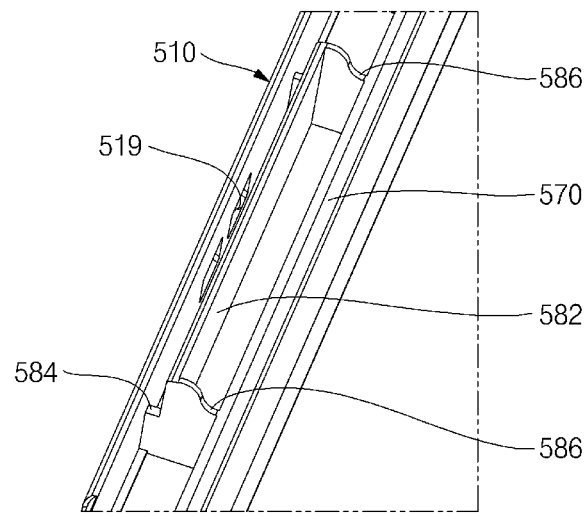
FIG. 5 is an enlarged perspective view of the major parts of the main frame shown in FIG. 4, viewed in a different direction.
Figure 6:
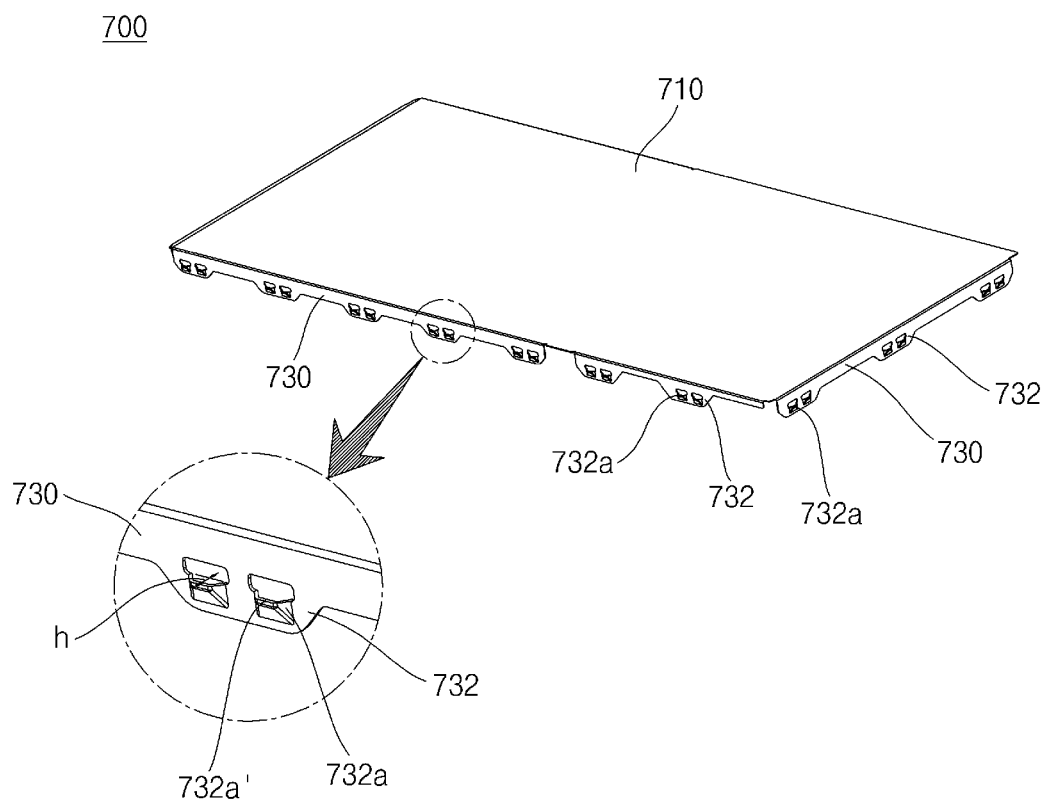
FIG. 6 is a perspective view of a main cover of the battery pack shown in FIGS. 1 and 2.
Figure 7:
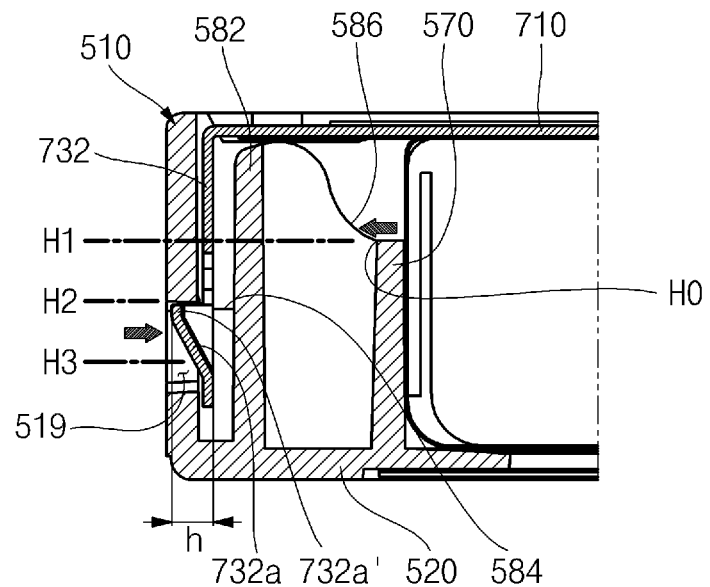
FIG. 7 is a perspective view of a coupled portion of the main frame and a main cover.
Figure 8:
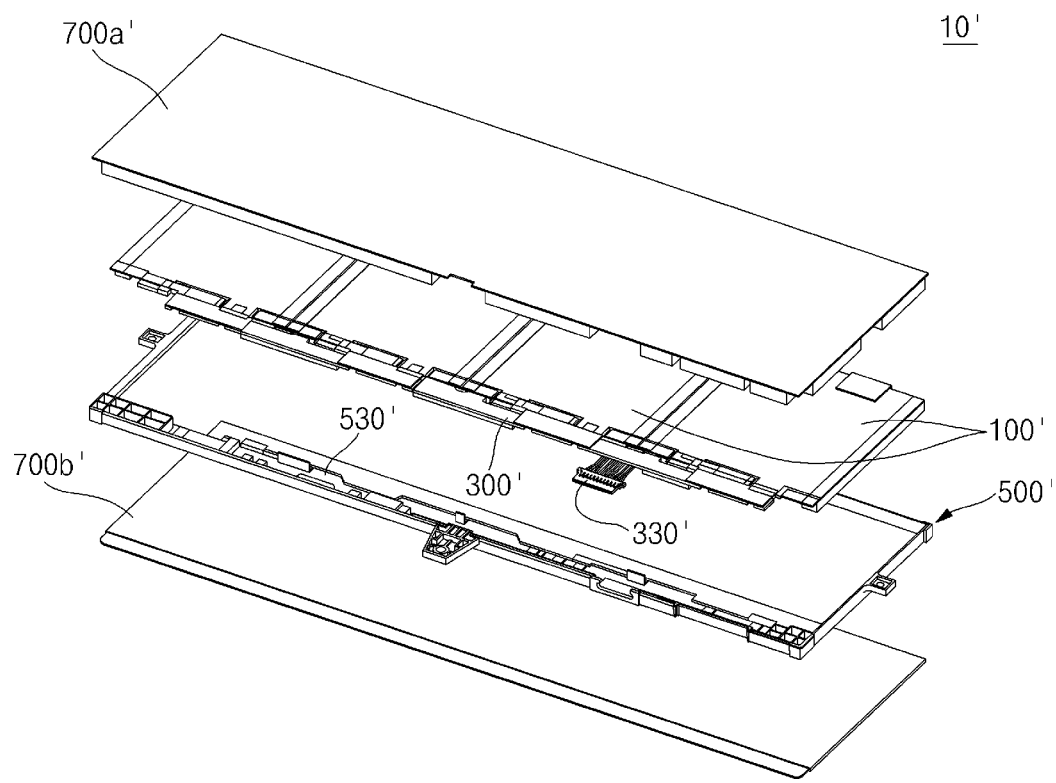
FIG. 8 is a perspective view of a battery pack according to another embodiment.

FIG. 1 is a perspective view of a battery pack according to an embodiment. FIG. 2 is an exploded perspective view of the battery pack shown in FIG. 1. FIG. 3 is a perspective view of a main frame of the battery pack shown in FIGS. 1 and 2. FIG. 4 is an enlarged perspective view of major parts of the main frame shown in FIG. 3. FIG. 5 is an enlarged perspective view of the major parts of the main frame shown in FIG. 4, viewed in a different direction. FIG. 6 is a perspective view of a main cover of the battery pack shown in FIGS. 1 and 2. FIG. 7 is a perspective view of a coupled portion of the main frame and a main cover. FIG. 8 is a perspective view of a battery pack according to another embodiment.

As illustrated in FIGS. 1 and 2, the battery pack 10 according to an embodiment may include a battery cell or plurality of battery cells 100, a protective circuit module 300 electrically connected to the battery cells 100, a main frame 500 accommodating the battery cells 100 (e.g., in which the removeable battery cells 100 are supportable) and the protective circuit module 300, and a main cover 700 coupled to the main frame 500. In an implementation, various other kinds of plates or tapes for protecting the battery cells 100 are not major components of the present disclosure, and thus detailed illustration and descriptions thereof may be omitted.

As illustrated in FIG. 2, the battery cell 100 may have a general structure including an electrode assembly including a positive electrode plate, a negative electrode plate, a separator therebetween, a case accommodating the electrode assembly and an electrolyte solution, and positive and negative electrode tabs drawn out from the positive and negative electrode plates, respectively. When a battery cell is a prismatic or pouch-type battery cell, the battery pack may also be applied to the battery cell 100 of the present disclosure. In the present disclosure, as to a specific configuration of the battery cell, a suitable technique can be applied, and thus a detailed description thereof may not be given.

As illustrated in FIG. 2, the protective circuit module (PCM) 300 may include a circuit board 310 electrically connected to the positive and negative electrode tabs of the battery cell 100 and a connector 330 for electrically connecting the PCM 300 to external equipment.

A plurality of protection devices electrically connected to the circuit board 310 through wiring patterns may be provided in the circuit board 310, and the positive and negative electrode tabs are electrically connected to the wiring patterns through tab connectors. The plurality of battery cells 100 may be electrically connected in series or in parallel by the wiring patterns formed in the circuit board 310. The wiring patterns of the circuit board 310 may be electrically connected to external equipment through the connector 330, thereby controlling charging and discharging of the battery cells 100.

As to a specific configuration of the protective circuit module, a suitable technique can be applied, and thus a detailed description thereof may not be given.

In a state in which the battery cells 100 and the protective circuit module 300 are mounted on the main frame 500, the main cover 700 may be coupled to the main frame 500.

As illustrated in FIGS. 2 to 5, the main frame 500 may have a rectangular ring shape having open top and bottom surfaces. The main cover 700 may be coupled to the open top surface of the main frame 500.

The main frame 500 may be made of SUS material (e.g., stainless steel). When the main frame 500 is made of SUS material, the battery pack 10 may have an excellent mechanical strength and a reduced thickness, as compared to when the main frame 500 is made of a material other than the SUS material. When the main frame 500 is made of SUS material, and the main cover 700 described below is made of a material such as a plastic, a coupling force of a coupling portion between the main frame 500 and the main cover 700 may be weakened due to a difference in the characteristic and strength between the materials used for the main frame 500 and the main cover 700, as compared to when the same material is used in the coupling portion between the main frame 500 and the main cover 700.

The main frame 500 may include a sidewall portion 510 forming an accommodating space, a mounting surface 520 (which is integrally formed with the sidewall portion 510 and on which the battery cells 100 are mounted), and a circuit mounting portion 530 (in or on which the protective circuit module 300 is mounted). In an implementation, the main frame 500 may further include an auxiliary sidewall 540 (partitioning the accommodating space in a widthwise direction inside the sidewall portion 510) and a connecting surface 550 according to the mounting location shape of a product in which the battery pack 10 is mounted.

In an implementation, the main frame 500 may further include a cover coupling frame 560 to be coupled to the main cover 700, a sub-frame or plurality of sub-frames 570 supporting one-side edges of the battery cells 100, and reinforcement units or reinforcers 580 reinforcing the coupling portion of the main frame 500 with the main cover 700. To address the possibility of weakened coupling force of the coupling portion, the battery pack 10 may include the reinforcers 580.

The sidewall portion 510 is a portion forming the rectangular ring-shaped edge of the main frame 500. A height of the sidewall portion 510 may be larger than that (e.g., a thickness) of each of the battery cells 100. For brevity, the sidewall portion 510 may include first to fourth sidewalls 511 to 517. The first to fourth sidewalls 511 to 517 may define the edge of the main frame 500, which has a substantially rectangular ring-shape.

The first sidewall 511 and the third sidewall 515 may be short sides of the main frame 500, which face each other. The second sidewall 513 and the fourth sidewall 517 may be long sides of the main frame 500, which may face each other. In an implementation, for the purpose of forming or accommodating the circuit mounting portion 530, the fourth sidewall 517 may be shorter than the second sidewall 513.

A hook hole or plurality of hook holes 519 may be formed on or in the first to fourth sidewalls 511 to 517, e.g., penetrating the first to fourth sidewalls 511 to 517. Positions of the hook holes 519 may correspond to those of hooks 732a of the main cover 700 to be described below.

The mounting surface 520 may be integrally formed with the bottom end of the sidewall portion 510. The auxiliary sidewall 540 and the connecting surface 550 may be between the second sidewall 513 and the fourth sidewall 517 in a widthwise direction.

The mounting surface 520 may vertically extend from the bottom end of the sidewall portion 510 to support one surface of the battery cell 100. The mounting surface 520 may form the bottom surface of the main frame 500 and may have a width that may help prevent the battery cell 100 from deviating therefrom, rather than a width enough to entirely occupy the bottom surface of the main frame 500. In an implementation, the mounting surface 520 may have a shape adapted to support bottom edges of each of the battery cells 100 according to the number of the battery cells 100.

In an implementation, if the number of battery cells 100 included in the battery pack 10 is three, the mounting surface 520 may form planes corresponding to bottom edges of each of the three battery cells 100. Open holes may be in regions other than the bottom edges of the battery cells 100. In an implementation, the mounting surface 520 may be configured such that holes having a smaller size than the battery cells 100 are formed on a substantially rectangular plate.

As illustrated in FIGS. 2 and 3, the circuit mounting portion 530 may be a portion where the protective circuit module of the battery cells 100 is mounted. The circuit mounting portion 530 may outwardly protrude further than the fourth sidewall 517. In an implementation, the circuit mounting portion 530 may be covered by the protection cover 534 shown in FIG. 2. In addition, a connector withdrawal part 532a (through which the connector 330 is exposed) may be formed in the circuit mounting portion 530.

The protection cover 534 may surround the mounting surface 532 from the upper side, e.g., as illustrated in FIG. 1. In an implementation, the protection cover 534 may cover the protective circuit module 300 on the mounting surface 532 by adopting one of the aforementioned structures. In an implementation, the protective circuit module 300 may be blocked or covered by the protection cover 534 so as not to be exposed. In an implementation, the protection cover 534 may be separately provided to then be coupled to the or may integrally formed with the main cover 700 to then be coupled to the main cover 700.

In an implementation, the accommodating space (in which the battery cells 100 are accommodated) may be formed by the sidewall portion 510 and the mounting surface 520, and the accommodating space may be divided into multiple spaces, as desired.

As illustrated in FIGS. 2 and 3, the auxiliary sidewall 540 may be arranged (e.g., may extend lengthwise) in the direction in which the second sidewall 513 and the fourth sidewall 517 are connected. In an implementation, the auxiliary sidewall 540 may be arranged to partition the accommodating space in or relative to the lengthwise direction of the main frame 500. The auxiliary sidewall 540 may be integrally formed with the second sidewall 513 and the fourth sidewall 517 by connecting opposite ends thereof to the second sidewall 513 and the fourth sidewall 517 or by connecting at least one end thereof to the second sidewall 513 or the fourth sidewall 517.

The auxiliary sidewall 540 may include a pair of auxiliary sidewalls provided according to the shape of a region where the battery pack 10 is installed, and a connecting surface 550 connecting the pair of auxiliary sidewalls 540 may be formed. In some cases, interference could occur between the battery pack and a peripheral component according to the location of a product in which the battery pack is mounted. Therefore, when the battery cells 100 are not arranged in a line to install the battery pack 10 so as to be kept away from the peripheral component, the auxiliary sidewall 540 and the connecting surface 550 may be provided. A through-hole formed in the connecting surface 550 may be used for separating the connecting surface 550 from a mold which is not a feature of this application, and a detailed description thereof may be omitted.

In an implementation, a wire for electrical connection of the battery pack 10 may be provided at a lower side of the connecting surface 550 shown in FIG. 3. Here, in order to avoid interference with the wire, the auxiliary sidewall 540 and the connecting surface 550 may be formed for the purpose of partitioning the main frame 500 to accommodate the battery cells 100. However, as shown in FIG. 8, the coupling structure of the main frame 500 and the main cover 700 according to the present disclosure may also be applied to a general battery cell accommodating structure in which the accommodating space is not partitioned.

Next, a coupling structure for coupling the main cover 700 will be described in further detail.

As illustrated in FIGS. 3 and 4, the cover coupling frame 560 may be inside the sidewall portion 510 (e.g., on an inner side of the sidewall portion 510) positioned toward the battery cells 100, and may extend upwardly from the mounting surface 520 so as to face the sidewall portion 510. In coupling the main cover 700, the main cover 700 may be inserted between the sidewall portion 510 and the cover coupling frame 560. Referring to FIG. 4, the main cover 700 may be coupled to a gap between the second sidewall 513 and the cover coupling frame 560. Such a coupling structure may be commonly applied to all of the first to fourth sidewalls 511 to 517 defining the sidewall portion 510. A distance between the cover coupling frame 560 and the sidewall portion 510 corresponds to a thickness of a portion into which the main cover 700 is inserted in coupling the main cover 700. In an implementation, the distance between the cover coupling frame 560 and the sidewall portion 510 may correspond to a distance in which the hooks 732a (to be described below) may be inserted.

The cover coupling frame 560 may have a height equal to or slightly smaller than that of the sidewall portion 510. In an implementation, the cover coupling frame 560 may be formed at each of the second sidewall 513 and the fourth sidewall 517. The sub-frames 570 may be formed at the first sidewall 511 and the third sidewall 515.

As illustrated in FIGS. 3 to 5, each of the sub-frames 570 may be formed inside the first sidewall 511 and the third sidewall 515, respectively, and may extend upwardly from the mounting surface 520. Ends of the sub-frame 570 may be connected to the cover coupling frame 560 or may be formed separately from the cover coupling frame 560. When the battery cells 100 are mounted on the mounting surface 520, the sub-frame 570 may support one side of each of the battery cells 100, thereby preventing movement of the battery cells 100. Therefore, when the battery cells 100 are mounted, the sub-frames 570 may be at locations where they closely contact the battery cells 100. The sub-frames 570 may have a size that helps prevent movement of the battery cells 100 while not being interfered with the main cover 700 in coupling the main cover 700.

The reinforcers 580 may be between the sub-frame 570 and each of the first sidewall 511 and the third sidewall 515 to help protect the battery cells 100 and protective circuit module 300 from external impacts and to help prevent separation of the main cover 700.

As illustrated in FIGS. 4, 5, and 7, each of the reinforcers 580 may include a first rib 582 (e.g., a plurality of first ribs 582) supporting the coupling portion of the main cover 700, a connection rib 584 connecting the first rib 582 and the sidewall portion 510, and a reinforcement rib 586 between the connection rib 584 and the sub-frame 570.

In an implementation, the first rib 582 may include a plurality of first ribs each disposed to be parallel with the first sidewall 511 and between the first sidewall 511 and the sub-frame 570. In an implementation, the plurality of first ribs 582 may be parallel with the third sidewall 515 and between the third sidewall 515 and the sub-frames 570. The first rib 582 may be at a region where each of the hook holes 519 is formed and may have a length sufficient to cover the region where the hook hole 519 is formed. In an implementation, the length of the first rib 582 may be smaller than that of the sub-frame 570.

A distance between the first rib 582 and each of the first sidewall 511 and the third sidewall 515 may be larger than the thickness of an insertion portion 732 of the main cover 700 and smaller than the thickness of the hook 732a (h of FIG. 7). The first rib 582 may provide a reaction force for preventing the hook 732a from deviating from a state in which the hook 732a is engaged with (e.g., in an interengaging relationship with) the hook hole 519 (e.g., may help prevent the hook 732a from decoupling or detaching from the main frame 500). If the distance between the first rib 582 and each of the first sidewall 511 and the third sidewall 515 were to be excessively large, it could be difficult for the first rib 582 to sufficiently provide the reaction force against the external force applied to the hook 732a. In an implementation, the distance between the first rib 582 and each of the first sidewall 511 and the third sidewall 515 may be smaller than a width h of the hook 732a.

In coupling the main cover 700 with the main frame 500, the first rib 582 may have a smaller height than that of the first sidewall 511 and the third sidewall 515, so as to allow the main cover 700 to closely contact the main frame 500. In addition, one of opposite ends of the first rib 582 may be connected to the first sidewall 511 or the third sidewall 515 by the connection rib 584 having a smaller height than the first rib 582, and the other of the opposite ends of the first rib 582 may be connected to the sub-frame 570 by the reinforcement rib 586 having a smaller height than the first rib 582 to then be supported.

In an implementation, a portion of the first rib 582, which is not supported by the connection rib 584 and the reinforcement rib 586, may be temporarily deformable, and the hook 732a may be inserted into the hook hole 519, even if the distance between the first rib 582 and the sidewall portion 510 is smaller than the width h of the hook 732a. For example, the portion of the first rib 582, which is not supported by the connection rib 584 and the reinforcement rib 586, may exhibit elasticity (e.g., may be elastically biased toward the insertion portion 732), and may help prevent the hook 732a of the insertion portion 732 from coming out of the hook hole 519.

The connection rib 584 may be integrally formed with the opposite end of the first rib 582 and may be connected to the first sidewall 511 or the third sidewall 515. The connection rib 584 may have a height ranging from a point corresponding to half of the height of the hook hole 519a to a top end height of the hook hole 519. The term "height" used herein means a distance measured upwardly from the mounting surface 520, on the basis of FIG. 7.

The reinforcement rib 586 may face the connection rib 584 and may be integrally formed with the opposite ends of the first rib 582 to then be connected to the sub-frame 570. The reinforcement rib 586 may be shaped to have a height gradually decreasing from the top end of the first rib 582 in a streamlined manner, unlike the connection rib 584. In an implementation, the reinforcement rib 586 may have a streamlined shape so as to get closer to the mounting surface 520 away from the top end of the first rib 582.

The reinforcement rib 586 may be integrally formed with the connection rib 584 to form a plane (e.g., a continuous flat surface). In an implementation, the first rib 582 may be configured such that opposite ends thereof are supported by the connection rib 584 and the reinforcement rib 586. The reinforcement rib 586 may be located adjacent to the hook hole 519 and the hook 732a to support the hook 732a so as not to be disengaged from the hook hole 519. To this end, the length and location of the first rib 582 may be set in consideration of the location of the reinforcement rib 586.

In an implementation, on the basis of FIG. 7, the reinforcement rib 586 may be opposite to the hook hole 519 with the hook 732a interposed therebetween. The hook hole 519 and the reinforcement rib 586 may not be arranged in a line but may be arranged to be opposite to each other, and thus the reinforcement rib 586 may help support the hook 732a.

A point where the reinforcement rib 586 and the top end of the first rib 582 meet may be defined as a topmost point of the reinforcement rib 586, and a point where the reinforcement rib 586 and the mounting surface 520 meet (also a point where the reinforcement rib and the bottom end of the sub-frame meet) may be defined as a bottommost point of the reinforcement rib 586. A top end of a point where the reinforcement rib 586 and the top end of the sub-frame 570 meet may be defined as a contact point H0.

In an implementation, as shown in FIG. 7, a contact point height H1 of the reinforcement rib 586 may be higher than a height H2. The contact point height H1 of the reinforcement rib 586 may be higher than a height H3.

The term "height" used herein means a distance (length) ranging or measured from (e.g., in a vertical direction) the mounting surface 520 on the basis of FIG. 7 in which the mounting surface 520 of the main frame 500 faces downward. Reference symbol H1 means a distance from the mounting surface 520 to the contact point H0 of the reinforcement rib 586. Reference symbol H2 means a distance from the mounting surface 520 to a contact end 732a' of the hook 732a. Reference symbol H3 means a distance from the mounting surface 520 to a point corresponding to half or mid-point of the hook hole 519 to the top end height of the hook hole 519.

The contact point height H1 of the reinforcement rib 586 refers to a height at which a reaction force against the external force applied to the hook 732a in coupling the main cover 700, which will be described below.

As illustrated in FIG. 6, the main cover 700 may include a main plate 710 and a cover side surface 730 at edges of the main plate 710. The main cover 700 may be formed by injection-molding an insulating material such as a plastic for the purpose of insulating.

The main plate 710 may cover the open top surface of the main frame 500 and may have a size sufficient to entirely cover the battery cells 100. The cover side surface 730 may extend downwardly from the edges of the main plate 710.

The cover side surface 730 extending downwardly from the edges of the main plate 710 may be inserted between the sidewall portion 510 and the cover coupling frame 560. The cover side surface 730 may have a width that is smaller than that of the insertion portion 732, and an insertion portion or a plurality of insertion portions 732 may extend downward therefrom. The term "width" used herein means an extending length ranging or measured from (e.g., downwardly from) the edges of the main plate 710. The cover side surface 730 may have a smaller width than the insertion portion 732 to avoid interference between the cover side surface 730 and a peripheral structure, such as the connection rib 584, when the main cover 700 is coupled to the main frame 500.

The insertion portion 732 may extend downwardly from the bottom end of the cover side surface 730. At least one hook 732a may be on the insertion portion 732. The entire width of the cover side surface 730 including the insertion portion 732 may be equal to or slightly smaller than the width of the sidewall portion 510. In an implementation, a position of the hook 732a may correspond to or be aligned with the hook hole 519 of the sidewall portion 510.

As illustrated in FIGS. 6 and 7, the hook 732a may slantingly protrude outwardly from the plane of the insertion portion 732. The top end of the protruding hook 732a may form the contact end 732a', which may come into contact with the top end (e.g., inner top side) of the hook hole 519. The hook 732a may be configured such that it becomes farther away from the insertion portion 732 in an upward direction from its lower side toward the contact end 732a'. The contact end 732a' (at the top end of the hook 732a) may have a predetermined width h. The contact end 732a' may be locked into the hook hole 519, and the main cover 700 may be retained coupled to the main frame 500.

In the battery pack 10 having the aforementioned configuration according to an embodiment, when the main frame 500 made of SUS material and the main cover 700 made of a plastic material, there is a possibility of the hook 732a being disengaged from the hook hole 519 due to an external force.

Referring to FIG. 7, the possibility of the hook 732a being disengaged from the hook hole 519 could be increased when an external force is applied to the top end of the hook 732a, e.g., the contact end 732a', as compared to when the external force is applied to the bottom end the hook 732a. In order to help reduce or prevent disengagement of the hook 732a by providing a reaction, pressing, or elastic force against the external force applied to the hook 732a (in a direction indicated by the left arrow of FIG. 7), the hook 732a may be supported in a direction opposite to the direction of the external force applied to the hook 732a (in a direction indicated by the right arrow of FIG. 7). To this end, the reinforcement rib 586 may be provided. In an implementation, the reinforcement rib 586 may be located adjacent to the hook hole 519.

As described above, the contact point height H1 of the reinforcement rib 586 may be higher than the height H2 of the contact end 732a' of the hook 732a. In an implementation, the contact point height H1 of the reinforcement rib 586 may be higher than the height H3 of the point corresponding to at least a half of the length of the hook hole 519 to provide a sufficient reaction force.

In an implementation, the contact point of the reinforcement rib 586 may be far away from (e.g., distal to) the hook hole 519 and may be spaced apart from a contact portion of the contact end 732a' of the hook 732a and the hook hole 519. In an implementation, the reinforcement rib 586 may be formed such that a length ranging from one end of the reinforcement rib 586, which is connected to the mounting surface 520, to the other end which extends from the one end, is larger than a length ranging from the mounting surface 520 to the center of the hook hole 519.

The aforementioned battery pack 10 according to an embodiment may be configured such that a plurality of battery cells 100 are arranged in a line, and an accommodating space of the battery cells 100 may be partially partitioned so that some of the battery cells 100 are separated from one another. In an implementation, a battery pack 10' may be configured such that a plurality of battery cells 100 are mounted to be adjacent to one another without partitioning an accommodating space. The battery pack 10' according to another embodiment is shown in FIG. 8.

As illustrated in FIG. 8, the battery pack 10' according to another embodiment may include a plurality of battery cells 100', a protective circuit module 300' electrically connected to the battery cells 100' and electrically connected to an external circuit by a connector 330', a main frame 500' accommodating the battery cells 100' and the protective circuit module 300', and an upper cover 700a' and a lower cover 700b' coupled to the main frame 500'.

The battery pack 10' may have the same coupling structure as described above with reference to FIGS. 1 to 7 and may be configured such that the main frame 500' accommodating the battery cells 100' is not provided with the auxiliary sidewall 540 and the connecting surface 550 of the battery pack 10 according to an embodiment. In addition, the battery pack 10' may be configured such that a circuit mounting portion 530' does not protrude outwardly from the main frame 500'. Therefore, a repeated description will not be given.

As described in the foregoing embodiments, the battery pack coupling structure may also be applied to a battery pack having prismatic or pouch-type battery cells. In addition, the coupling structure may also be applied to a battery pack having cylindrical battery cells as long as the main frame 500, 500' and the main cover 700 (or the upper cover 700a' and the lower cover 700b') are coupled to each other with a hook mechanism.

One or more embodiments may provide a battery pack that can support coupling portions to help prevent a case from being separated as the coupling portions are disengaged due to external impacts.

In the battery pack according to an embodiment, the reinforcement ribs may be adjacent to coupling portions of the hooks and the hook holes. Accordingly, the reinforcement ribs may help support the hooks and help prevent the hooks from being inadvertently pushed away to disengaged positions due to, e.g., external impacts. Therefore, the hooks may be firmly retained coupled to the hook holes without being separated from the hook holes by an external force.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a main frame supporting a battery cell, the main frame including a hook hole and a reinforcer adjacent to the hook hole; and
a main cover coupled to the main frame, the main cover including a hook inserted into and retained in engagement with the hook hole,
wherein:
the reinforcer faces the hook hole with the hook therebetween to support the hook,
the main frame includes:
a mounting surface configured to support a surface of the battery cell, and
a sidewall portion extending along edges of the mounting surface,
the reinforcer includes:
a first rib parallel with the sidewall portion, extending from the mounting surface, and being between the battery cell and the sidewall portion, and
a connection rib integrally formed with each of opposite ends of the first rib to physically connect each of the opposite ends of the first rib to the sidewall portion,
a distance between the first rib of the reinforcer and the sidewall portion of the main frame is smaller than a width of the hook, and
the main frame includes a contact point, at which a top of a reinforcement rib is connected to a top of a sub-frame, positioned farther from the mounting surface than a mid-point of the hook hole is from the mounting surface.

2. The battery pack as claimed in claim 1, wherein:
the battery cell includes another surface, and
the main frame further includes the sub-frame adjacent to the first rib and parallel with the sidewall portion, the sub-frame extending from the mounting surface, being between the battery cell and the first rib, and being in contact with the other surface of the battery cell.

3. The battery pack as claimed in claim 2, wherein the reinforcer further includes the reinforcement rib integrally formed with the connection rib and extending toward the sub-frame to be connected to the sub-frame, the reinforcement rib defining a continuous flat surface with the connection rib and physically connecting each of the opposite ends of the first rib to the sub-frame.

4. The battery pack as claimed in claim 3, wherein a height of the reinforcement rib from the mounting surface is larger than a height of a mid-point of the hook hole from the mounting surface.

5. The battery pack as claimed in claim 3, wherein a length of the first rib is smaller than a length of the sub-frame.

6. The battery pack as claimed in claim 5, wherein the reinforcement rib is adjacent to the hook hole.

7. The battery pack as claimed in claim 3, wherein a contact region of the reinforcement rib and the sub-frame is distal to the hook hole such that the contact region is spaced apart from a region where a contact end of the hook locked into the hook hole contacts the hook hole.

8. The battery pack as claimed in claim 7, wherein the main frame includes the contact point, at which a top of the reinforcement rib is connected to a top of the sub-frame, positioned farther from the mounting surface than the contact end is from the mounting surface.

9. The battery pack as claimed in claim 1, wherein a height of the first rib from the mounting surface is smaller than a height of the sidewall portion from the mounting surface.

10. The battery pack as claimed in claim 1, wherein the first rib includes flexible material, the first rib having at least two ribs aligned with each other and spaced apart from each other along a length direction of the first rib.

11. A battery pack, comprising:
a main frame on which a battery cell is supportable, the main frame including a hook hole and a reinforcer adjacent to the hook hole; and
a main cover coupled to the main frame, the main cover including a hook inserted into and retained in engagement with the hook hole,
wherein:
the reinforcer faces the hook hole with the hook therebetween to support the hook,
the main frame includes:
a mounting surface configured to support a surface of the battery cell, and
a sidewall portion extending along edges of the mounting surface,
the reinforcer includes:
a first rib parallel with the sidewall portion, extending from the mounting surface, and being between the battery cell and the sidewall portion, and
a connection rib integrally formed with each of opposite ends of the first rib to physically connect each of the opposite ends of the first rib to the sidewall portion, a distance between the first rib of the reinforcer and the sidewall portion of the main frame is smaller than a width of the hook, and the main frame includes a contact point, at which a top of a reinforcement rib is connected to a top of a sub-frame, positioned farther from the mounting surface than a mid-point of the hook hole is from the mounting surface.

\* \* \* \* \*